(12) United States Patent
Jalbert et al.

(10) Patent No.: US 6,892,652 B2
(45) Date of Patent: May 17, 2005

(54) SELF-ADJUSTING DYNAMIC FLOATING FIXTURE

(75) Inventors: Robert Jalbert, Northfield, CT (US); William J. Andrews, Danbury, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 320 days.

(21) Appl. No.: 10/223,918

(22) Filed: Aug. 19, 2002

(65) Prior Publication Data

US 2004/0031423 A1 Feb. 19, 2004

(51) Int. Cl.[7] ............................................. A47B 13/00
(52) U.S. Cl. ........................................ 108/161; 108/20
(58) Field of Search ........................... 108/161, 20, 21, 108/22, 143; 248/603, 633, 637, 576, 580, 581, 562, 346.04, 346.05, 346.2, 346.5; 74/16

(56) References Cited

U.S. PATENT DOCUMENTS

| | | | | | |
|---|---|---|---|---|---|
| 1,915,466 A | * | 6/1933 | Lilly | ........................... | 248/603 |
| 1,992,112 A | * | 2/1935 | Allen | ........................... | 248/603 |
| 4,602,555 A | * | 7/1986 | Bushey | ........................... | 108/20 |
| 5,031,547 A | * | 7/1991 | Hirose | ........................... | 108/20 |
| 5,163,651 A | * | 11/1992 | Matsumoto | ........................... | 108/20 |
| 5,165,296 A | * | 11/1992 | Yanagisawa | ........................... | 108/143 |
| 6,363,809 B1 | * | 4/2002 | Novak et al. | ........................... | 108/143 |
| 6,681,703 B2 | * | 1/2004 | Wells et al. | ........................... | 108/20 |

* cited by examiner

*Primary Examiner*—Jose V. Chen
(74) *Attorney, Agent, or Firm*—Harness, Dickey & Pierce, P.L.C.

(57) ABSTRACT

A self-adjusting, dynamic floating fixture for ultrasonic welding having a base, a nest assembly for supporting a part to be welded, and a plurality of bearing assemblies operably disposed between the base and the nest assembly to permit the nest assembly to move relative to the base to minimize marking and flash damage to the part to be welded.

11 Claims, 1 Drawing Sheet

SELF-ADJUSTING DYNAMIC FLOATING FIXTURE

FIELD OF THE INVENTION

The present invention generally relates to ultrasonic welding and, more particularly, relates to a self-adjusting fixture for use in ultrasonic welding.

BACKGROUND OF THE INVENTION

As is well known in the art, ultrasonic welding is often used to join various parts together to affect a strong and reliable joint therebetween. Ultrasonic welding generally employs mechanical vibrations at ultrasonic frequencies and pressure to affect an intimate contact between faying surfaces to produce a weld joint. The ultrasonic welding apparatus generally includes a transducer that converts electrical frequencies to ultra-high-frequency mechanical vibrations. By applying the tip of a vibrating tool, anvil, or horn to a small area on the external surface of two lapped parts, the vibrations and pressure are transmitted to the faying surfaces to produce the weld joint.

However, when employing ultrasonic welding technology to join parts having complex external contours or profiles, the welding process may produce undesirable markings and/or damage to the parts being joined. For example, it has been found that in cases where the external contour of at least one part to be joined is substantially non-coplanar to the weld plane, significant side loading forces are imparted on the parts to be joined. These significant side-loading forces cause the aforementioned undesirable markings and/or damage to the parts being joined.

Accordingly, there exists a need in the relevant art to provide a fixture for ultrasonic welding that is capable of accommodating these side-loading forces without causing damage to the parts to be welded. Furthermore, there exists a need in the relevant art to provide a fixture for ultrasonic welding that is capable of accommodating inclined weld planes. Still further, there exists a need in the relevant art to provide a fixture for ultrasonic welding that is capable of overcoming the disadvantages of the prior art.

SUMMARY OF THE INVENTION

According to the principles of the present invention, a self-adjusting, dynamic floating fixture for ultrasonic welding having an advantageous construction is provided. The floating fixture includes a base, a nest assembly for supporting a part to be welded, and a plurality of bearing assemblies operably disposed between the base and the nest assembly to permit the nest assembly to move relative to the base to minimize marking and flash damage to the part to be welded.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
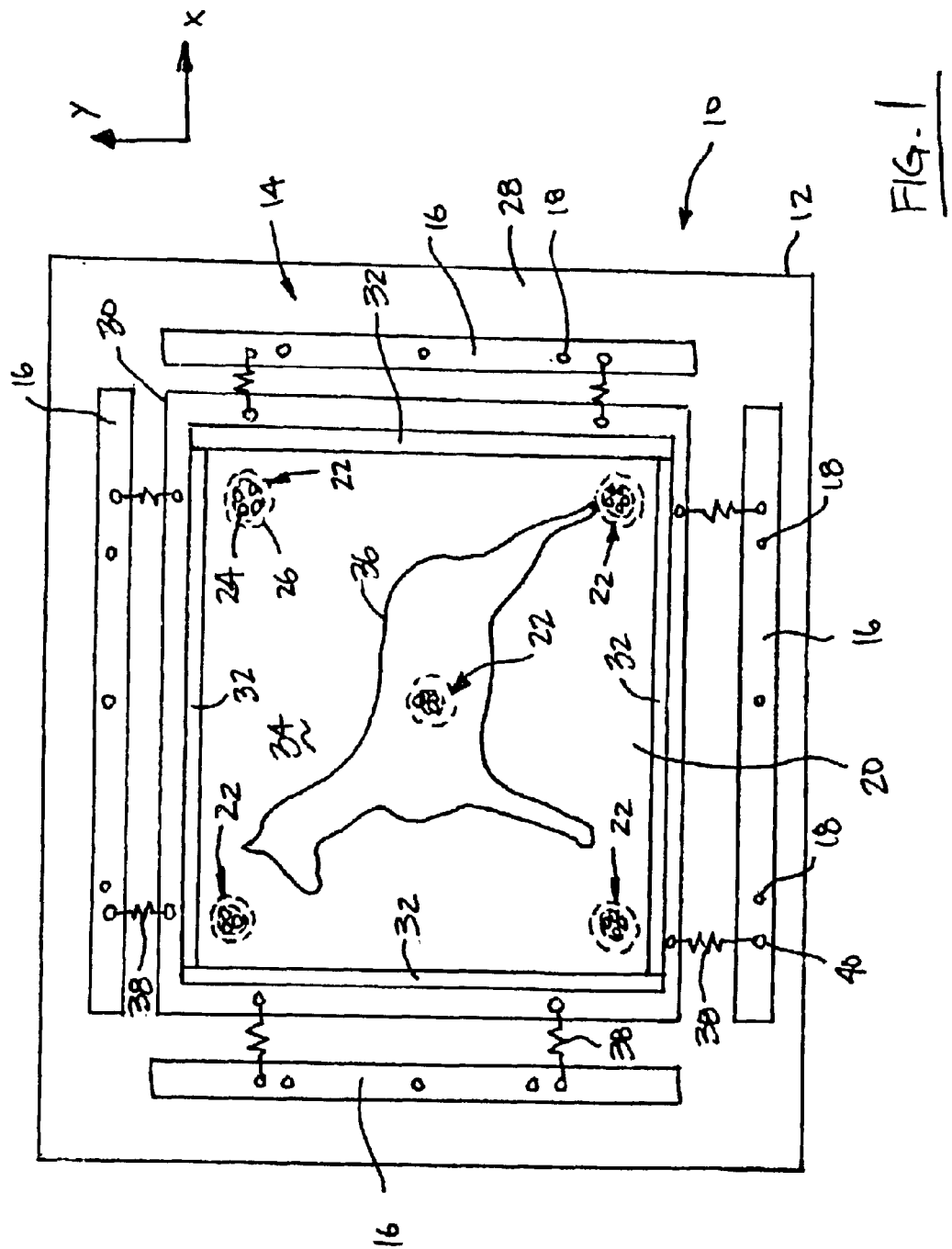
FIG. 1 is a schematic plan view illustrating a self-adjusting, dynamic floating fixture for use in ultrasonic welding according to the principles of the present invention.
Figure 1:
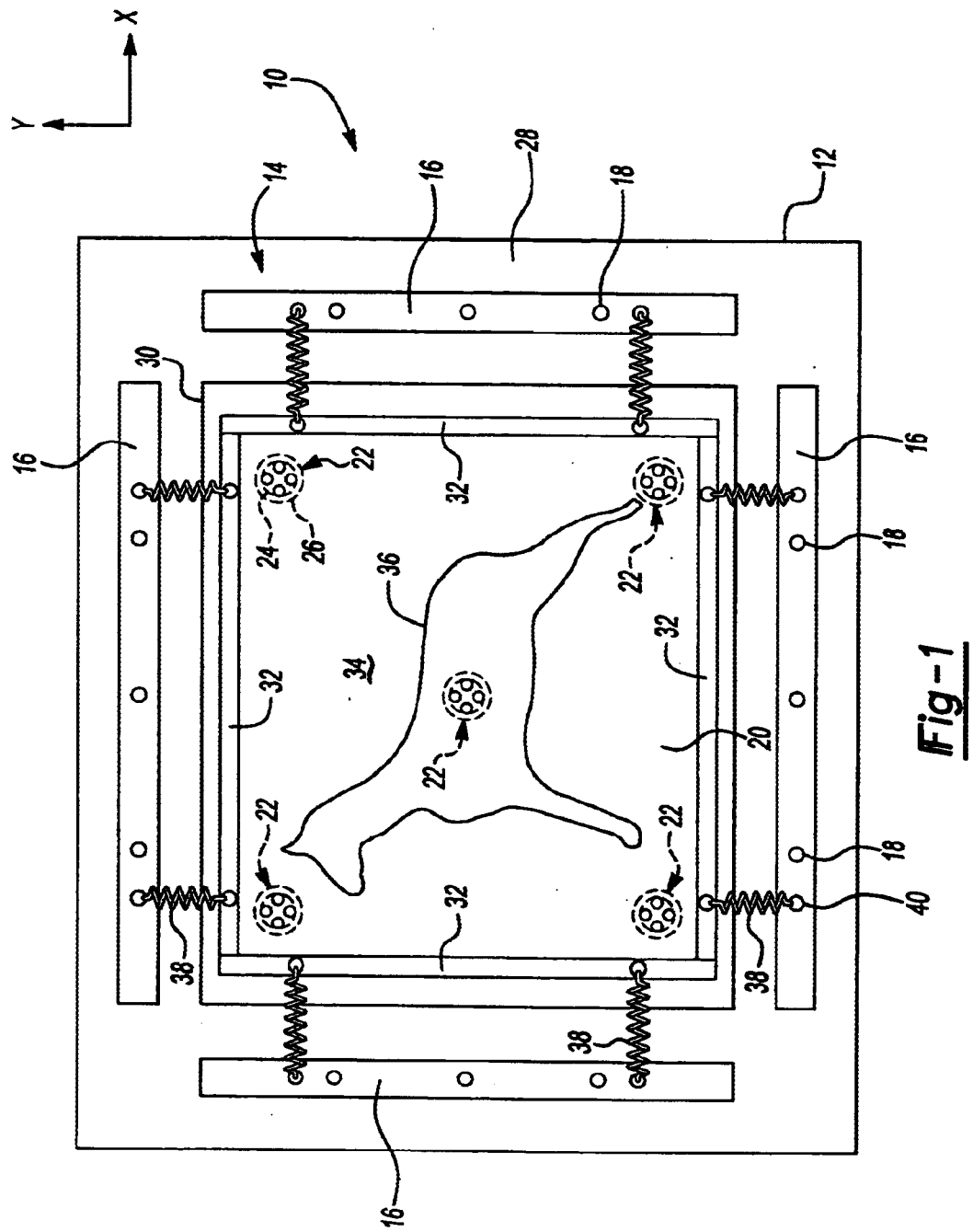

Referring now to FIG. 1, a self-adjusting dynamic floating fixture 10 is illustrated in accordance with the principles of the present invention. Self-adjusting dynamic floating fixture 10 is particularly adapted for use in connection with ultrasonic welding. More particularly, self-adjusting dynamic floating fixture 10 is intended to be used in connection with a standard stud welding ultrasonic process used for joining two halves of a product to be performed. As should be appreciated, the product to be formed may be one of any number of products having unique exterior profiles that are otherwise susceptible to marking and/or flash caused by the misalignment of the product halves.

Floating fixture 10 generally includes a base 12 supporting a dynamic floating nest assembly 14. More particularly, dynamic floating nest assembly 14 includes a plurality of spring rails 16 fixedly coupled to base 12 via a plurality of fasteners 18. Spring rails 16 are each fixedly coupled to base 12 generally inboard and adjacent to the periphery of base 12.

Dynamic floating nest assembly 14 further includes a nest 20. Nest 20 is slidably supported upon base 12 via a plurality of bearing assemblies 22. Specifically, each of the plurality of bearing assemblies 22 is comprised of a plurality of ball bearings 24 retained within a holder 26 in a generally planar relationship. Each of the plurality of bearing assemblies 22 generally rides between an upper surface 28 of base 12 and a lower surface (not shown) of a generally planar nest plate 30 of nest 20 and is preferably located at the four corners and center of nest plate 30. However, any configuration of bearings or alternative bearing designs is anticipated by this invention. As will be described in further detail below, nest 20 is capable of sliding relative to base 12 to facilitate the self-adjustment of dynamic floating nest assembly 14 during the ultrasonic welding process to eliminate, or at least minimize, markings and/or flash in the final product.

Nest 20 is generally comprised of nest plate 30, which generally extends parallel to base 12, and a plurality of upwardly extending end plates 32. Upwardly extending end plates 32 are each fixedly coupled to nest plate 30 using conventional fasteners to define a nest volume 34. Nest volume 34 is preferably filled with a poured urethane material or other formable nest substrate material to define a concave, contoured volume 36 adapted to closely conform and retained a lower half of the product to be welded. However, it should be appreciated that nest volume 34 may include contoured aluminum or any other conventional materials used in ultrasonic welding fixtures.

Still referring to the figure, self-adjusting dynamic floating fixture 10 further includes a plurality of springs 38 operably coupled between nest plate 30 of dynamic floating nest assembly 14 and the plurality of spring rails 16. Specifically, each of the plurality of springs 38 is an extension spring and is respectively secured to nest plate 30 and each of the plurality of spring rails 16 via fasteners 40, such as a shoulder screw. The plurality of springs 38 cooperate to automatically center dynamic floating nest assembly 14 relative to base 12 and the associated welding horn (not shown). However, the plurality of springs 38 further cooperate to enable dynamic floating nest assembly 14 to slide relative to base 12 upon the plurality of bearing assemblies 22 during the ultrasonic welding process. This sliding movement is in response to significant side loading forces which occur when to product halves are brought together for welding along an inclined interface. That is, the plurality of springs 38 allows dynamic floating nest assembly 14 to slide relative to base 12 to accommodate these significant side-loading forces until an equilibrium position is reached during the welding process.

It should be appreciated, however, that although dynamic floating nest assembly 14 is free to move in the X or Y directions, the mass of dynamic floating nest assembly 14 and the inertia associated therewith prevent dynamic floating nest assembly 14 from coupling in frequency with the welding horn. Following the ultrasonic welding and the removal of the welding horn, dynamic floating nest assembly 14 is permitted to return to its centered position, thereby positioning it for the next welding cycle.

According to the principles of the present invention, there are number of advantages over conventional ultrasonic welding fixtures. By way of non-limiting example, the present invention provides an apparatus which is capable of eliminating, or at least minimizing, unwanted marking and/or flash damage to the parts to be welded. In previous fixture designs for use with sheer stud ultrasonic welding, when the welding interface is at such an angle the force of the welding horn causes each of the product halves to shift relative to each other, thereby causing the aforementioned marking damage. However, during the use of the present invention, as the welding halves are brought in the contact, the interface studs are able to self align due to the floating nature of dynamic floating nest assembly 14. This movement enables the product halves to automatically align with each other.

Furthermore, according to conventional ultrasonic welding fixture designs, it was important that the fixture be properly aligned with the welding holder prior to the next welding cycle to again prevent damage to be welded parts. However, the present invention provides a self-centering feature that enables dynamic floating nest assembly 14 to reset itself after the welding cycle to be in a position for subsequent welding. As can be appreciated from the foregoing, if dynamic floating nest assembly 14 is not perfectly centered relative to the welding horn or the second half of the part, dynamic floating nest assembly 14 will accommodate any of these variations during the welding cycle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A floating fixture for ultrasonic welding two product halves, said fixture comprising:
    a base;
    a self-adjusting dynamic floating nest assembly having a nest, said nest being adapted for supporting a part to be welded, said nest assembly being moveable in response to side loading forces produced when the two product halves are brought together for welding along an inclined interface; and
    a plurality of bearing assemblies operably disposed between said base and said nest assembly to permit said nest assembly to move relative to said base.

2. The fixture according to claim 1, further comprising:
    a plurality of springs coupling said nest assembly to said base, said plurality of springs biasing said nest assembly into a centered position.

3. The fixture according to claim 2 wherein each of said plurality of springs is an extension spring.

4. A floating fixture for ultrasonic welding, said fixture comprising:
    a base;
    a nest assembly having a nest, said nest being adapted for supporting a part to be welded; and
    a plurality of bearing assemblies operably disposed between said base and said nest assembly to permit said nest assembly to move relative to said base,
    wherein said nest assembly comprises:
    a generally planar nest plate;
    a plurality of end plates fixedly coupled and upwardly extending from said nest plate, said nest plate and said plurality of end plates together defining a nest volume; and
    a nest substrate disposed within said nest volume, said nest substrate being capable of retaining said part to be welded.

5. The fixture according to claim 4 wherein said nest substrate is made of a urethane material.

6. The fixture according to claim 1 wherein said plurality of bearing assemblies comprises:
    a plurality of ball bearings; and
    a holder rotatably securing each of said plurality of ball bearings.

7. A floating fixture for ultrasonic welding, said fixture comprising:
    a base;
    a nest assembly having a nest, said nest being adapted for supporting a first part to be welded to a second part;
    a plurality of bearing assemblies operably disposed between said base and said nest assembly to permit said nest assembly to move relative to said base; and
    a plurality of springs coupling said nest assembly to said base, said plurality of springs biasing said nest assembly into a centered position such that said nest assembly is moveable in response to side loading forces produced when said first part is brought together with said second part for welding.

8. The fixture according to claim 7 wherein each of said plurality of springs is an extension spring.

9. A floating fixture for ultrasonic welding, said fixture comprising:
    a base;
    a nest assembly having a nest, said nest being adapted for supporting a part to be welded;
    a plurality of bearing assemblies operably disposed between said base and said nest assembly to permit said nest assembly to move relative to said base; and
    a plurality of springs coupling said nest assembly to said base, said plurality of springs biasing said nest assembly into a centered position
    wherein said nest assembly comprises:
    a generally planar nest plate;
    a plurality of end plates fixedly coupled and upwardly extending from said nest plate, said nest plate and said plurality of end plates together defining a nest volume; and
    a nest substrate disposed within said nest volume, said nest substrate being capable of retaining said part to be welded.

10. The fixture according to claim 9 wherein said nest substrate is made of a urethane material.

11. The fixture according to claim 7 wherein said plurality of bearing assemblies comprises:
    a plurality of ball bearings; and
    a holder rotatably securing each of said plurality of ball bearings.

* * * * *

UNITED STATES PATENT AND TRADEMARK OFFICE
CERTIFICATE OF CORRECTION

PATENT NO. : 6,892,652 B2  Page 1 of 2
DATED : May 17, 2005
INVENTOR(S) : Jalbert et al.

It is certified that error appears in the above-identified patent and that said Letters Patent is hereby corrected as shown below:

Please insert the attached formal drawing sheet, which was previously submitted by Applicant on February 9, 2005, to replace the informal drawing currently in the patent.

Signed and Sealed this

Thirtieth Day of August, 2005

JON W. DUDAS
*Director of the United States Patent and Trademark Office*